No. 763,698. PATENTED JUNE 28, 1904.
A. O. SMITH.
TRUCK.
APPLICATION FILED MAR. 24, 1902.
NO MODEL. 2 SHEETS—SHEET 1.
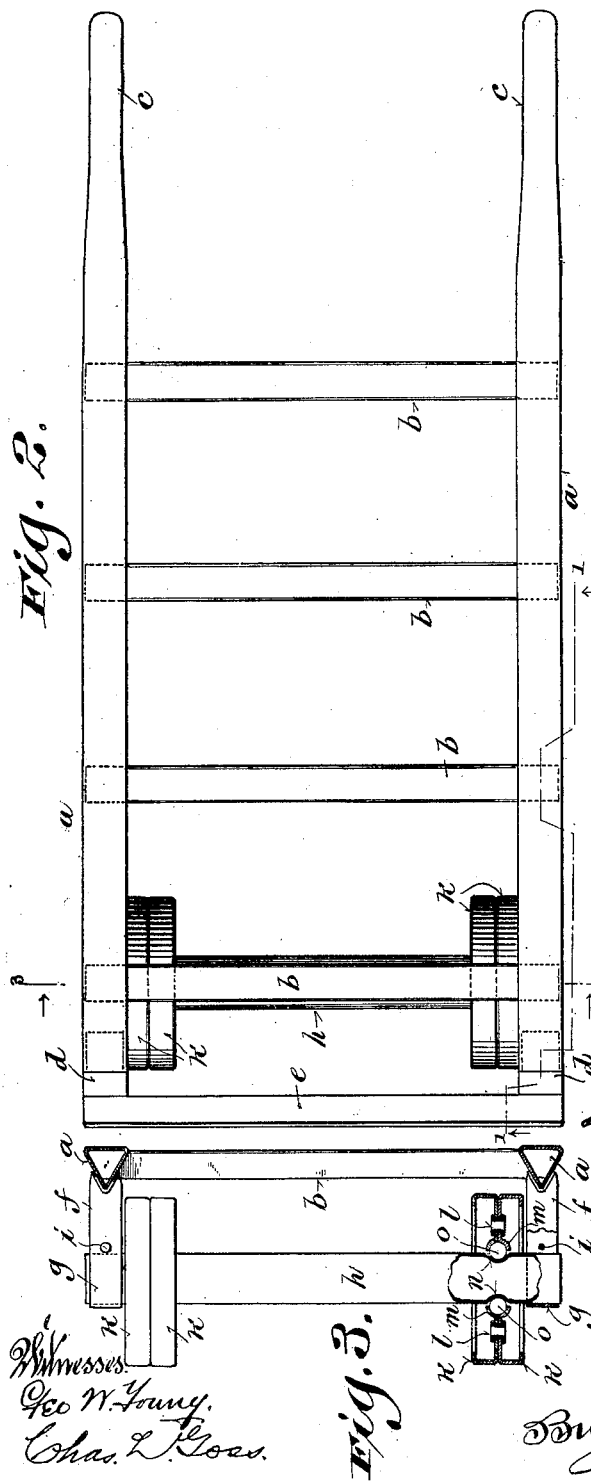
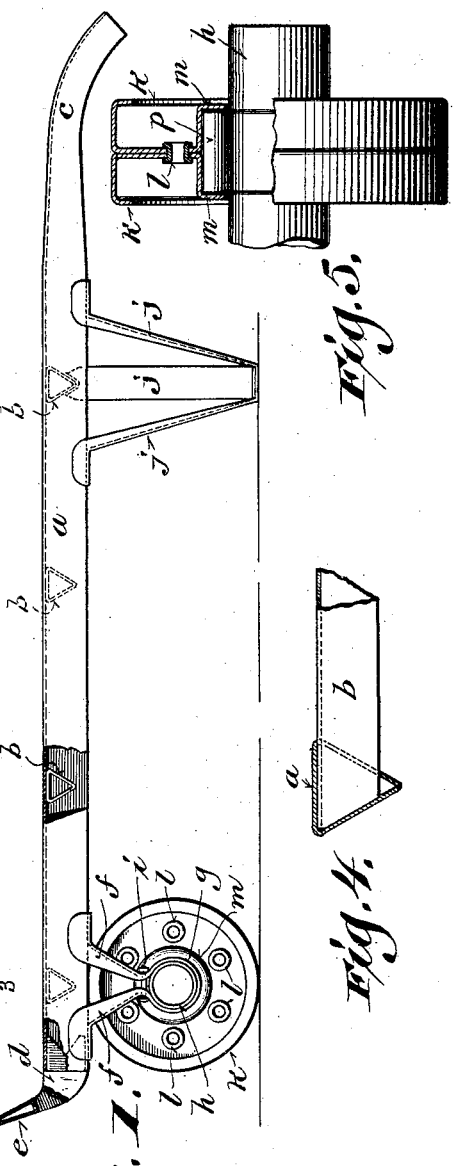
Inventor:
Arthur O. Smith
Witnesses:
Geo. W. Young.
Chas. L. Goss.
By Winkler Flanders Smith Bottum & Vilas
Attorneys.

No. 763,698. PATENTED JUNE 28, 1904.
A. O. SMITH.
TRUCK.
APPLICATION FILED MAR. 24, 1902.
NO MODEL. 2 SHEETS—SHEET 2.
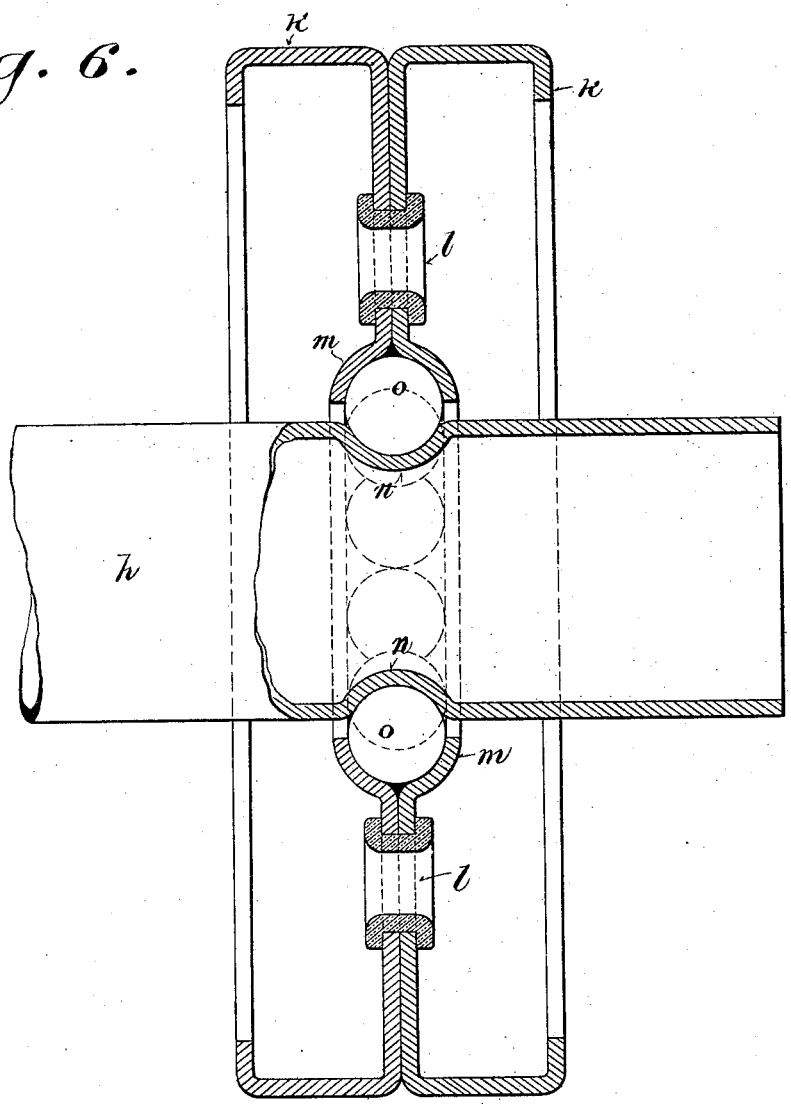

No. 763,698. Patented June 28, 1904.

UNITED STATES PATENT OFFICE.

ARTHUR O. SMITH, OF MILWAUKEE, WISCONSIN.

TRUCK.

SPECIFICATION forming part of Letters Patent No. 763,698, dated June 28, 1904.

Application filed March 24, 1902. Serial No. 99,650. (No model.)

*To all whom it may concern:*

Be it known that I, ARTHUR O. SMITH, a citizen of the United States, residing at Milwaukee, in the county of Milwaukee and State of Wisconsin, have invented certain new and useful Improvements in Trucks, of which the following is a specification, reference being had to the accompanying drawings, forming a part thereof.

My invention relates particularly to trucks for handling freight or heavy articles. Its main object is to produce a strong, durable, and light truck of this kind entirely of metal.

It consists in certain peculiar features of construction and in the arrangement and combinations of parts, substantially as hereinafter particularly described, and as pointed out in the claims.

In the accompanying drawings like letters designate the same parts in the several figures.

Figure 1 is a side elevation of a truck embodying my invention, parts of the frame being broken away and shown in section on the line 1 1, Fig. 2. Fig. 2 is a plan view of the truck. Fig. 3 is an end view and vertical cross-section on the line 3 3, Fig. 2. Fig. 4 is an enlarged detail view showing the preferred mode of joining the cross-pieces with the side pieces of the frame. Fig. 5 is an enlarged view in section and elevation, showing a wheel and portion of an axle of a slightly-modified construction; and Fig. 6 is an enlarged sectional view of one of the wheels and a portion of the axle shown in Figs. 1, 2, and 3.

As shown in the drawings, the truck has a metallic frame composed mainly of triangular tubes $a$ $a$ and $b$ $b$, arranged with one of their flat sides up and the opposing angles down. The side pieces $a$ $a$ are contracted and rounded in cross-section and bent lengthwise to form handles $c$ $c$ of the usual shape at one end of the frame. The cross-pieces $b$ $b$, which are of smaller diameter or cross-section than the side pieces $a$, are inserted at the ends through openings in the inside walls of the side pieces and beveled to fit against the outside walls of said side pieces, as shown in Fig. 4. The flat tops of the cross-pieces are brazed or otherwise attached at the ends to the flat tops of the side pieces on the under sides thereof.

At the front end of the frame or the end opposite the handles $c$ $c$ metal fittings $d$ are inserted and secured by brazing or otherwise in the ends of the side pieces $a$. These fittings are turned up and flattened at their outer ends, to which the ends of a sharply-folded nose-piece $e$ are brazed or otherwise secured.

$f$ $f$ are brackets formed with contractile collars $g$ and upwardly-diverging branches terminating in V-shaped seats, which are fitted and brazed or otherwise secured to the side pieces $a$ of the frame on the under side.

$h$ is a tubular axle secured at the ends in the collars $g$ by clamping-bolts $i$, passing through the arms of the brackets $f$ next to said collars.

The frame is provided adjacent to the ends of the cross-bar nearest the handle $c$ with metallic legs, each composed of three upwardly-diverging branches $j$, terminating at their upper ends in V-shaped seats, which are fitted and brazed or otherwise attached to a side and cross-piece of the frame. Two of these branches, which are attached at their upper ends to a side piece $a$, may be conveniently formed together from a single band or piece of metal, while the third branch, which is attached at its upper end to a cross-piece $b$, is formed at its lower end with a foot, which is brazed or otherwise attached to the first two branches at their junction with each other.

The several parts of the frame above mentioned when assembled, as shown in the drawings, may be permanently secured to each other by dipping the entire frame in a bath of spelter, which will not only securely hold the parts together without rivets or other fastenings, but will also afford an incorrodible finishing coat.

The wheels are each composed of two annular flanged sections $k$ $k$, which are secured together by hollow rivets $l$ or other suitable fastenings, so as to form on the outside plain treads or cylindrical faces and on the inside roller races or channels $m$. The axle $h$ is formed near the ends with external circumferential roller races or channels $n$, preferably pressed into the tube of which the axle is made, and in these races or channels and the surrounding races or channels $m$ in the wheels rollers $o$ are loosely held. When the sections of the wheels are permanently fastened to each other by rivets, as shown, or otherwise, they are first assembled with the rollers $o$ in place on the axle. In place of spherical rollers cylindrical rollers $p$ may be employed, the races or channels in the wheels and axle being correspondingly shaped, as shown in Fig. 5. When spherical rollers are used, the races or channels therefor in the wheels may be made adjustable to take up wear or play and may also be so constructed that the wheels, with the balls or rollers, may be assembled upon or removed from the axle after the component parts of the wheels have been permanently secured to each other.

The main parts of the truck-frame may be made either of seamless or brazed tubing. I prefer, however, to use brazed tubing, making the seams or joints along the angles on the under side of the frame.

In the construction herein shown and described the metal is disposed so as to secure the greatest possible rigidity and strength with the least weight.

Various changes in details of construction may be made within the spirit and intended scope of the invention.

I claim—

1. A truck having a metallic frame composed of triangular tubes arranged with flat sides up and opposite angles down, substantially as described.

2. A truck having a metallic frame composed of triangular tubes, the side pieces being rounded and curved longitudinally at one end, and the cross-pieces being inserted at the ends through openings in the inside walls, and secured to the top walls of the side pieces, substantially as described.

3. A truck having a metallic frame composed of triangular tubes arranged with flat sides up and opposing angles down, the cross-pieces, which are smaller in cross-section than the side pieces, being inserted at the ends through triangular openings in the inside walls and secured at the top to the top walls of the side pieces, substantially as described.

4. A truck having an axle with circular roller-bearings, a metallic wheel composed of two annular parts fastened together and forming on the outside a plain cylindrical tread or face and on the inside an annular roller race or channel, and rollers held in said race or channel around the bearing of said axle, substantially as described.

5. A truck having an axle with circular roller-bearings, metallic wheels each composed of outwardly-flanged annular parts secured together face to face, the outer flanges forming a plain cylindrical tread or face, and the inner flanges forming an annular roller race or channel, and rollers held in said races or channels around the bearings of said axle, substantially as described.

6. A truck having an axle formed with circumferential roller races or channels, wheels each composed of annular sections fastened together and forming annular roller races or channels on the inside and rollers held on opposite sides in said races or channels, substantially as described.

7. A truck having a tubular axle formed with external roller races or channels indented or pressed into the same, wheels each composed of annular sections fastened together and forming on the outside a plain tread or face and on the inside an annular roller race or channel, and rollers inserted in the opposing races or channels in said wheels and axle, substantially as described.

8. In a truck the combination of a metallic frame composed of triangular tubes arranged with flat sides up and opposite angles down, and legs each composed of three branches diverging upwardly and formed at their upper ends with V-shaped seats which are fitted and secured to the side pieces and a cross-piece of the frame, substantially as described.

9. In a truck the combination of a metallic frame composed of triangular tubes arranged with flat sides up and opposite angles down, brackets formed with contractile collars, and divergent arms terminating in V-shaped seats which are fitted and secured to the side pieces of the frame, a tubular axle secured in said contractile collars by clamping-bolts, wheels mounted on said axle, and legs each composed of three upwardly-diverging branches terminating in V-shaped seats which are fitted and secured to the side pieces and a cross-piece of the frame, substantially as described.

In witness whereof I hereto affix my signature in presence of two witnesses.

ARTHUR O. SMITH.

Witnesses:
JOSEPH F. KAMINSKY,
CHAS. L. GOSS.